(12) United States Patent
Hantzer et al.

(10) Patent No.: US 6,723,229 B2
(45) Date of Patent: Apr. 20, 2004

(54) PROCESS FOR THE PRODUCTION OF MEDICINAL WHITE OIL USING M41S AND SULFUR SORBENT

(75) Inventors: Sylvain S. Hantzer, Prairieville, LA (US); Jean Willem Beeckman, Columbia, MD (US); Stephen J. McCarthy, Center Valley, PA (US); Arthur Paul Werner, Mclean, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 106 days.

(21) Appl. No.: 10/085,230

(22) Filed: Feb. 27, 2002

(65) Prior Publication Data

US 2003/0062292 A1 Apr. 3, 2003

Related U.S. Application Data

(60) Provisional application No. 60/290,234, filed on May 11, 2001.

(51) Int. Cl.$^7$ .......................... C10G 65/04; C10G 67/06
(52) U.S. Cl. .......................... 208/210; 208/89; 208/91; 208/143; 208/212; 208/213; 208/217
(58) Field of Search ........................... 208/89, 91, 143, 208/210, 212, 213, 217

(56) References Cited

U.S. PATENT DOCUMENTS

| | | | |
|---|---|---|---|
| 3,392,112 A | 7/1968 | Bercik et al. ............... | 208/210 |
| 3,459,656 A | 8/1969 | Rausch ........................ | 208/57 |
| 4,055,481 A | 10/1977 | Kidwell, Jr. ................. | 208/89 |
| 4,251,347 A | 2/1981 | Rausch et al. ................ | 208/57 |
| 4,263,127 A | 4/1981 | Rausch et al. ................ | 208/58 |
| 4,325,804 A | 4/1982 | Everett et al. ................ | 208/58 |
| 4,786,402 A | 11/1988 | Anstock et al. ............. | 208/443 |
| 5,344,553 A | 9/1994 | Shih ........................... | 208/49 |
| 6,187,176 B1 | 2/2001 | Hantzer et al. ............. | 208/268 |

OTHER PUBLICATIONS

Girgis et al., *Ind. Eng. Chem. Res.*, 1991, 30, 2021–2058.
Houalla et al., *J. Catal.*, 61, 523–527 (1980).
Lamure–Meille et al., *Applied Catalysis A: General*, 131 (1995) 143–157.
Mochida et al., *Catalysis Today*, 29 (1996), 185–189.
Vasudevan et al., *Catal. Rev.—Sci. Eng.*, 38(2), 161–188 (1996).

Primary Examiner—Walter D. Griffin
(74) Attorney, Agent, or Firm—Gerard J. Hughes; Jeremy J. Kliebert

(57) ABSTRACT

A four stage process for producing high quality white oils, particularly food or medicinal grade mineral oils from mineral oil distillates. The first reaction stage employs a sulfur resistant hydrotreating catalyst and produces a product suitable for use as a high quality lubricating oil base stock. The second reaction stage employs a hydrogenation/hydrodesulfurization catalyst. The third stage employs a reduced metal sulfur sorbent producing a product stream which is low in aromatics and which has substantially "nil" sulfur. The final reaction stage employs a selective hydrogenation catalyst that produces a product suitable as a food or medicinal grade white oil.

13 Claims, 1 Drawing Sheet

FIGURE
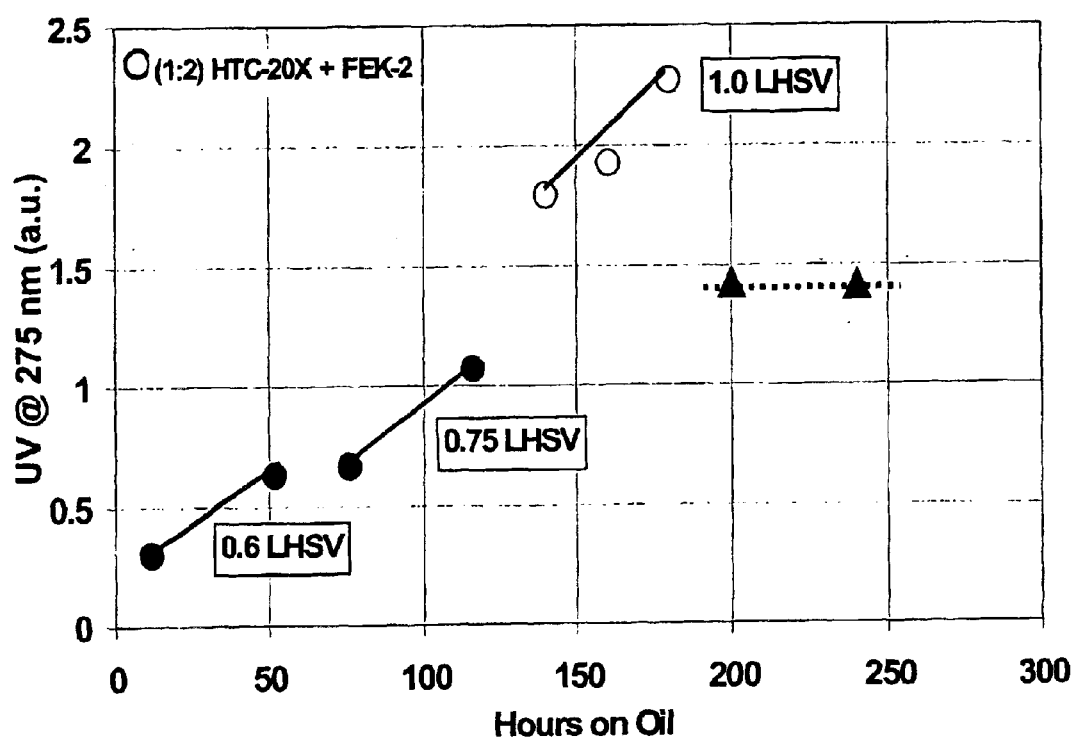

PROCESS FOR THE PRODUCTION OF MEDICINAL WHITE OIL USING M41S AND SULFUR SORBENT

CROSSS-REFERENCE TO RELATED APPLICATION

This patent application claims benefit of U.S. provisional patent application Ser. No. 60/290,234 filed May 11, 2001.

FIELD OF THE INVENTION

This invention relates to a four-stage process for producing high quality white oils particularly food grade mineral oils from mineral oil distillates. The process includes three separate hydrotreating stages and a sulfur sorbent stage.

BACKGROUND OF THE INVENTION

White mineral oils, called white oils, are colorless, transparent, oily liquids obtained by the refining of crude petroleum feedstocks. In the production of white oils, an appropriate petroleum feedstock is refined to eliminate, as completely as possible, oxygen, nitrogen, and sulfur compounds, reactive hydrocarbons including aromatics, and any other impurity which would prevent use of the resulting white oil in the pharmaceutical or food industry. White oils generally fall into two classes, technical grade and pharmaceutical grade. Technical grade white oils are those suitable for use in cosmetics, textile lubrication, bases for insecticides, and the like. The more highly refined pharmaceutical grade white oils are those suitable for use in drug compositions, foods, and for the lubrication of food handling machinery. The pharmaceutical grade white oils must be chemically inert and substantially without color, odor, or taste. Also, for these applications manufacturers must remove "readily carbonizable substances" (RCS) from the white oil. RCS are impurities that cause the white oil to change color when treated with strong acid. The Food and Drug Administration (FDA) and white oil manufacturers have stringent standards with respect to RCS, which must be met before the white oil can be marketed for use in food or pharmaceutical applications. In particular, the Code of Federal Regulations, 21 C.F.R. §172.878(1988) defines white mineral oil as a mixture of liquid hydrocarbons, essentially paraffinic in nature obtained from petroleum and refined to meet the test requirements of the *United States Pharmacopoeia XX*, pp. 532 (1980) for readily carbonizable substances and for sulfur compounds. The Ultraviolet Absorption Test generally measures the ultraviolet absorbance of an extract in the range of 260–350 nm, which absorbance is then compared with that of a naphthalene standard. This test sets forth limits for the presence of polynuclear compound impurities in the white oil.

White oil must also pass the Hot Acid Carbonizable Substances Test (ASTM D-565) to conform to the standard of quality required for pharmaceutical use. In order to pass this test the oil layer must show no change in color and the acid level is not darker than that of the reference standard colorimetric solution. From this test it will be seen that for purposes of interpreting test results, the art has recognized that a value of 16 or below on a standard test, the Hellige Amber C Color Wheel, is sufficient to pass the carbonizable substances test.

The present invention is primarily concerned with the production of pharmaceutical grade white oils. There are numerous processes in the prior art for the production of white oils of both grades. In general, the first step in the production of white oil is the removal of lighter fractions, such as gasoline, naphtha, kerosene, and gaseous fractions, from the feedstock by fractional distillation. In early processes, white oil was refined by treatment with sulfuric acid to remove unsaturated aromatic and unstable hydroaromatic compounds, which comprised most of the impurities present in the oil. Typically, the acid treated oil was subjected to adsorption refining to remove such impurities as carbon, coke, asphaltic substances, coloring matter and the like.

Conventional methods of making white oils with sulfuric acid however, have been subject to objection in recent years since acid treating is costly and gives rise to undesirable amounts of sludge. Because of objections to sulfuric acid treatments, other procedures were developed for the production of white oils from hydrocarbon feedstocks. Representative processes of these procedures can be found in U.S. Pat. Nos. 3,392,112; 3,459,656; 4,055,481; 4,251,347; 4,263,127; and 4,325,804. U.S. Pat. No. 4,786,402 discloses a two-step catalytic hydrogenation process. Further, U.S. Pat. No. 6,187,176 discloses a three-step catalytic hydrogenation process.

Hydrodesulfurization (HDS) is one of the fundamental processes of the refining and chemical industries. The removal of feed sulfur by conversion to hydrogen sulfide is typically achieved by reaction with hydrogen over non-noble metal sulfides, especially those of Co/Mo and Ni/Mo. The reaction is performed at fairly severe conditions of temperatures and pressures in order to meet product quality specifications, or to supply a desulfurized stream to a subsequent sulfur sensitive process. The latter is a particularly important objective because some processes are carried out over catalysts which are extremely sensitive to poisoning by sulfur. This sulfur sensitivity is sometimes sufficiently acute as to require a substantially sulfur free feed. In other cases environmental considerations and mandates drive product quality specifications to very low sulfur levels.

There is a well-established hierarchy in the ease of sulfur removal from the various organosulfur compounds common to refinery and chemical streams. Simple aliphatic, naphthenic, and aromatic mercaptans, sulfides, di- and polysulfides and the like surrender their sulfur more readily than the class of heterocyclic sulfur compounds comprised of thiophene and its higher homologs and analogs. Desulfurization reactivity decreases with increasing molecular structure and complexity within the generic thiophenic class. For example, the simple thiophenes are the more labile, or "easy" sulfur types. The other extreme, which is sometimes referred to as "hard sulfur" or "refractory sulfur," is represented by the derivatives of dibenzothiophene, especially those mono- and di-substituted and condensed ring dibenzothiophenes bearing substituents on the carbon beta to the sulfur atom. These highly refractory sulfur heterocycles resist desulfurization as a consequence of steric inhibition precluding the requisite catalyst-substrate interaction. For this reason, these materials survive traditional desulfurization and they poison subsequent processes whose operability is dependent upon a sulfur sensitive catalyst. Destruction of these "hard sulfur" types can be accomplished under relatively severe high-pressure process conditions, but this may prove to be economically undesirable owing to the onset of undesirable side reactions. Also, the level of investment and operating costs required to drive the severe process conditions may be too great for the required sulfur specification.

A recent review (M. J. Girgis and B. C. Gates, *Ind. Eng. Chem.*,1991, 30, 2021) addresses the fate of various thiophenic types at reaction conditions employed industrially, e.g., 340–425° C. (644–799° F.), 825–2550 psig. The substitution of a methyl group into the 4-position or into the 4- and 6-positions decreases the desulfurization activity by an order of magnitude for dibenzothiophenes. These authors state, "These methyl-substituted dibenzothiophenes are now recognized as the organosulfur compounds that are most slowly converted in the HDS of heavy fossil fuels. One of the challenges for future technology is to find catalysts and processes to desulfurize them."

M. Houalla et al, *J. Catal.*, 61, 523 (1980) disclose activity debits of 1 to 10 orders of magnitude for similarly substituted dibenzothiophenes under similar hydrodesulfurization conditions. While the literature addresses methyl substituted dibenzothiophenes, it is apparent that substitution with alkyl substituents greater than methyl, e.g., 4,6-diethyldibenzothiophene, would intensify the refractory nature of these sulfur compounds. Condensed ring aromatic substituents incorporating the 3,4 and/or 6,7 carbons would exert a similar negative influence. Similar results are described by Lamure-Meille et al, Applied Catalysis A: General, 131, 143, (1995) based on similar substrates.

Mochida et al, Catalysis Today, 29, 185 (1996) address the deep desulfurization of diesel fuels from the perspective of process and catalyst designs aimed at the conversion of the refractory sulfur types, which "are hardly desulfurized in the conventional HDS process." These authors optimize their process to a product sulfur level of 0.016 wt. %, which reflects the inability of an idealized system to drive the conversion of the most resistant sulfur molecules to extinction. Vasudevan et al, Catalysis Reviews, 38, 161(1996) in a discussion of deep HDS catalysis report that while Pt and Ir catalysts were initially highly active on refractory sulfur species, both catalysts deactivated with time on oil.

In light of the above, there is still a need for a desulfurization process that can convert feeds bearing the refractory, condensed ring sulfur heterocycles at relatively mild process conditions to products containing substantially no sulfur.

BRIEF DESCRIPTION OF THE FIGURE

The FIGURE plots the aromatic content by UV spectroscopy of the product obtained in Example 3 herein in relation to the time on oil of Example 3.

SUMMARY OF THE INVENTION

In accordance with the present invention there is provided a process for the preparation of pharmaceutical grade white oils from a mineral hydrocarbon oil feedstock having a viscosity ranging from, about 70 to about 600 SUS at 37.8° C., by a four stage catalytic process, which process comprises: (1) hydrotreating the mineral oil feedstock in a first reaction stage containing a hydrotreating catalyst and a hydrogen-containing treat gas under hydrotreating conditions, thereby resulting in a first stage reaction product which is at least partially hydrogenated and desulfurized; (2) hydrotreating the reaction product of the first reaction stage in a second reaction stage in the presence of: (i) a hydrodesulfurization catalyst comprised of a Group VIII metal on bound M41S support, (ii) a hydrogen containing treat gas, wherein the second reaction stage is operated at temperatures from about 150° C. to 500° C. and pressures from about 500 to 3,000 psig (3549 to 20,786 kPa); (3) treating hydrotreated product from stage 2 with a reduced metal hydrogen sulfide sorbent material in stage 3, and (4) hydrogenating the reaction product from reaction stage 3 in a fourth reaction stage in the presence of a Group VIII based catalyst, thereby producing a white oil.

In a preferred embodiment of the present invention, the Group VIII metal (Periodic Table by Fisher Scientific Co.) is a noble metal selected from Pt, Pd, Ir, and mixtures thereof supported on bound MCM-41.

In still another preferred embodiment of the present invention the initial feedstock is a solvent extracted lubricating oil having a viscosity ranging from about 70 to 600 SUS at 37.8° C.

In another preferred embodiment of the present invention, the hydrogen sulfide sorbent is selected from supported reduced non-noble Group VII metal.

The white oil product from the present process meets pharmaceutical requirements and has a hot acid number (ASTM D-565) of less than about 16 on the Hellige Amber C Color Wheel and an ultraviolet absorbance value of less than 0.1.

DETAILED DESCRIPTION OF THE INVENTION

The process of the present invention is applicable to removing sulfur from all sulfur bearing mineral hydrocarbon oil feedstocks. The process is particularly suitable for the desulfurization of the least reactive, most highly refractory sulfur species, especially the class derived from dibenzothiophenes, and most especially the alkyl, aryl, and condensed ring derivatives of this heterocyclic group, particularly those bearing one or more substituents in the 3-, 4-, 6-, and 7-positions relative to the thiophenic sulfur. The process of the present invention will result in a product stream having substantially no sulfur. For purposes of this invention, the term, "substantially no sulfur", depends upon the overall process being considered, but can be defined as a value less than about 1 wppm, preferably less than about 0.5 wppm, more preferably less than about 0.1 wppm, and most preferably less than about 0.01 wppm as measured by existing, conventional analytical technology.

The initial feedstocks suitable for use in the practice of the present invention are any petroleum hydrocarbon fraction capable of yielding a product of the desired purity range by treatment in accordance with the process steps of the present invention. When the desired final product of the present invention is a white mineral oil, or other oil in the lubricating range of viscosities, the charge to the first stage is preferably a light to heavy lubricating distillate which generally has viscosities ranging from about 70 SUS to 600 SUS at 37.8° C. For pharmaceutical grade white oil production, the charge stock is preferably a raffinate resulting from solvent treatment of a light to heavy neutral distillate oil with a selective solvent, i.e., a distillate fraction which has been extracted. For the production of technical grade white oils, a non-solvent extracted distillate oil may be used as the starting material. When the final product is charcoal lighter fluid, the charge stock can comprise alkylate bottoms such as materials obtained from sulfuric acid or hydrogen fluoride alkylation processes boiling above the gasoline range. When the final product is petrolatum, the chargestock can be paraffin slack wax, microcrystalline waxes, oils and the like. For producing pharmaceutical waxes, paraffin wax obtained by solvent dewaxing of a waxy lubrication distillate is suitable.

First stage hydrotreating catalysts are conventional hydrotreating catalysts such as those containing Group VIB metals (based on the Period Table published by Fisher Scientific), and non-noble Group VIII metals, i.e., iron, cobalt and nickel and mixtures thereof These metals or mixtures of metals are typically present as oxides or sulfides on refractory metal oxide supports. Preferred catalysts are those containing Co/Mo, Ni/Mo and Ni/W. The first stage hydrotreating conditions include temperatures of from 250–400° C., pressures of from 1000–3000 psig (6996–20,786 kPa), liquid hourly space velocities (LHSV) of from 0.1–5 and treat gas rates of from 1000–5000 scf/B (178–890 m$^3$/m$^3$).

Catalysts suitable for use in stage 2 of the present invention are those comprised of at least one noble or non-noble metal of Group VIII of the Periodic Table of the Elements supported in a highly dispersed and substantially uniformly distributed manner on bound M41 S support.

The bound stage 2 catalyst is a crystalline mesoporous material belonging to the M41S class or family of catalysts. The M41S family have high silica contents and are described in J. Amer. Chem. Soc., 1992, 114, 10834. Members of the M41S family include MCM-41, MCM-48 and MCM-50. A preferred member of this class is MCM-41 whose preparation is described in U.S. Pat. No. 5,098,684. MCM-41 is characterized by having a hexagonal crystal structure with a unidimensional arrangement of pores having a cell diameter greater than about 13 Angstroms. The physical structure of MCM-41 is like a bundle of straws wherein the opening of the straws (the cell diameters of the pores) ranges from about 13 to 150 Angstroms. MCM-48 has a cubic symmetry and is described for example in U.S. Pat. No. 5,198,203. MCM-50 has a layered or lamellar structure and is described in U.S. Pat. No. 5,246,689.

Group VIII noble metals that may be used for the hydrodesulfurization and partial hydrogenation catalysts of the present invention include Pt, Pd, and Ir; preferably Pt, Pd. Preferred bimetallic noble metal catalysts include Pt-Ir, Pd-Ir, and Pt-Pd; Pt-Ir and Pt-Pd are more preferred. These mono- and bimetallic noble metal catalysts may contain a promoter metal, preferably at least one of Re, Cu, Ag, Au, Sn, Zn, and the like, for stability and selectivity improvement Suitable binding materials for the bound M41S include inorganic, refractory materials such as alumina, silica, silicon carbide, amorphous and crystalline silica-aluminas (zeolites), silica-magnesias, aluminophosphates boria, titania, zirconia, and mixtures and cogels thereof. Preferred supports include alumina and low acidity crystalline or amorphous materials.

The metals may be loaded onto these supports by conventional techniques known in the art. Such techniques include impregnation by incipient wetness, by adsorption from excess impregnating medium, and by ion exchange. The metal bearing catalysts of the present invention are typically dried, calcined, and reduced; the latter may either be conducted ex situ or in situ as preferred. The catalysts need not be presulfided because the presence of sulfur is not essential to hydrodesulfurization activity and activity maintenance.

Total metal loading for stage 2 catalysts of the present invention is in the range of about 0.01 to 5 wt. %, preferably about 0.1 to 2 wt. %, and more preferably about 0.15 to 1.5 wt. %. For bimetallic noble metal catalysts similar ranges are applicable to each component; however, the bimetallics may be either balanced or unbalanced where the loadings of the individual metals may either be equivalent, or the loading of one metal may be greater or less than that of its partner. The loading of stability and selectivity modifiers ranges from about 0.01 to 2 wt. %, preferably about 0.02 to 1.5 wt. %, and more preferably about 0.03 to 1.0 wt. If present, chloride levels range from about 0.3 to 2.0 wt. %, preferably about 0.5 to 1.5 wt. %, and more preferably about 0.6 to 1.2 wt. %. Sulfur loadings of the noble metal catalysts approximate those produced by breakthrough sulfiding of the catalyst and range from about 0.01 to 1.2 wt. %, preferably about 0.02 to 1.0 wt. %.

Reaction conditions in Stage 2 include temperatures of from 150 to 500° C., preferably 250 to 400° C., pressures of from 500 to 3000 psig (3549 to 20,786 kPa), preferable 1000 to 2000 psig (6996 to 13,891 kPa), a LHSV of from 0.1 to 10, preferably 0.1 to 3 and a treat gas rate of from 500 to 10,000 scf/B (89 to 1780 m$^3$/m$^3$), preferably 1000 to 5000 scf/B (178 to 890 m$^3$/m$^3$).

The hydrogen sulfide sorbent of this invention may be selected from several classes of material known to be reactive toward hydrogen sulfide and capable of binding same in either a reversible or irreversible manner. Metals in their reduced state are useful in this capacity and may be employed supported on an appropriate support material such as an alumina, silica, or a zeolite, or mixtures thereof. Representative metals include those of the metals from Groups IA, IIA, IB, IIB, IIIA, IVA, VB, VIB, VIIB, VIII of the Periodic Table of the Elements. Representative elements include Zn, Fe, Ni, Cu, Mo, Co, Mg, Mn, W, K, Na, Ca, Ba, La, V, Ta, Nb, Re, Zr, Cr, Ag, Sn, and the like. The metals or their respective oxides may be employed individually or in combination. The preferred metals are those of Co, Ni, and Cu.

A preferred class of hydrogen sulfide sorbents are those which are regenerable as contrasted to those which bind sulfur irreversibly in a stoichiometric reaction. Active hydrogen sulfide sorbents regenerable through the sequential action of hydrogen and oxygen include iron, cobalt, nickel, copper, silver, tin, rhenium, molybdenum, and mixtures thereof. These regeneration reactions may be facilitated by the inclusion of a catalytic agent that facilitates the oxidation or reduction reaction required to restore the sulfur sorbent to its initial, active condition.

These regeneration processes operate over a temperature range of 200–700° C., preferably 250–600° C., and more preferably 275–500° C. at pressures of from 100 to 5000 psig (791 to 34,576 kPa).

The stage 4 catalysts have a high activity for hydrogenation and aromatic saturation. The catalysts include Group VIII metals on a support. Preferred metals are Ni, Pt and Pd, especially Ni. These metals are on the support in the reduced state, i.e., as metals. Typical supports include silica, alumina and M41S, especially MCM-41. Stage 4 reactions conditions include temperatures of from 150 to 300° C., pressures of 1000 to 3000 psig (6996 to 20,786 kPa), LHSV of 0.1 to 5 and treat gas rates of 500 to 5000 scf/B (89 to 890 m$^3$/m$^3$).

Various catalyst bed configurations may be used in the practice of the present invention. However, the preferred configuration is a stacked configuration, where the three components are layered sequentially with a HDS/ASAT (aromatic saturation) catalyst occupying the top position, the hydrogen sulfide sorbent the middle, and the stand-alone Group VIII-based hydrogenation catalyst the bottom zone. While the three component systems may occupy a common reactor, these systems may utilize a multi reactor train. This arrangement offers increased process flexibility permits operating the two reactor sections at different process conditions, especially temperature, and imparts flexibility in controlling process selectivity and/or product quality. Alternatively, each component could occupy separate reactors. This would allow process conditions for each component as well as facilitate frequent or continuous replacement of the hydrogen sulfide sorbent material. The HDS/ASAT catalyst and the preferred stand-alone Ni-based hydrogenation catalyst may or may not be the same material.

Noble metal catalysts can simultaneously provide HDS and aromatic saturation (ASAT) functions. The ASAT activity of the catalyst can be maintained if said catalyst is intimately mixed with a hydrogen sulfide sorbent. The mixed bed configuration, as described above, allows operation in this mode. If this configuration is employed, the use of a preferred stand-alone Ni-based hydrogenation catalyst after the mixed bed is optional, and said use would be dictated by specific process conditions and product quality objectives. If employed, the stand-alone Ni-based hydrogenation catalyst downstream may or may not be the same material as the HDS/ASAT catalyst used in the mixed bed. ASAT activity can also be maintained in a stacked bed configuration, but activity will generally be at a lower level than the mixed bed configuration.

Materials can also be formulated which allow one or more of the various catalytic functions of the instant invention (i.e., HDS, ASAT) and the hydrogen sulfide sorbent function to reside on a common particle. In one such formulation, the HDS/ASAT and hydrogen sulfide sorbent components are blended together to form a composite particle. For example, a finely divided, powdered Pt on alumina catalyst is uniformly blended with zinc oxide powder and the mixture formed into a common catalyst particle, or zinc oxide powder is incorporated into the alumina mull mix prior to extrusion, and Pt is impregnated onto the zinc oxide-containing alumina in a manner similar to that described in U.S. Pat. No. 4,963,249, which is incorporated herein by reference.

The composition of the sorbent bed is independent of configuration and may be varied with respect to the specific process, or integrated process, to which this invention is applied. In those instances where the capacity of the hydrogen sulfide sorbent is limiting, the composition of the sorbent bed must be consistent with the expected lifetime, or cycle, of the process. These parameters are in turn sensitive to the sulfur content of the feed being processed and to the degree of desulfurization desired. For these reasons, the composition of the guard bed is flexible and variable, and the optimal bed composition for one application may not serve an alternative application equally well. In general, the weight ratio of the hydrogen sulfide sorbent to the HDS/ASAT catalyst may range from 0.01 to 1000, preferably from 0.5 to 40, and more preferably from 0.7 to 30. For three component configurations the ranges cited apply to the mixed zone of the mixed/stacked arrangement and to the first two zones of the stacked/stacked/stacked design. The Group VIII-based hydrogenation catalyst present in the final zone of these two configurations is generally present at a weight equal to, or less than, the combined weight compositions of the upstream zones.

The process of this invention is operable over a range of conditions consistent with the intended objectives in terms of product quality improvement and consistent with any downstream process with which this invention is combined in either a common or sequential reactor assembly. It is understood that hydrogen is an essential component of the process and may be supplied pure or admixed with other passive or inert gases as is frequently the case in a refining or chemical processing environment. It is preferred that the hydrogen stream be sulfur free, or substantially sulfur free, and it is understood that the latter condition may be achieved if desired by conventional technologies currently utilized for this purpose. In general, the conditions of temperature and pressure are significantly mild relative to conventional hydroprocessing technology, especially with regard to the processing of streams containing the refractory sulfur types as herein previously defined.

EXAMPLES

This invention is illustrated by, but not limited to, the following examples which are for illustrative purposes only.

Example 1

In this example two hydrotreated white oil feedstocks (350N) were used. The feedstock had a density of about 0.867 g/cc at 15° C., and sulfur content of approximately 2.1 and 4.8 wppm, and an aromatic UV adsorption at 274 nm of approximately 27.2 and 70 in a 1 cm cell. These feedstocks were processed over a Pt-Pd alumina bound MCM-41, at 220° C. temperature, over a space velocity range of 0.6 to 3.5 h-, a pressure of 2,000 psig (13,891 kPa) and treat gas rate of 2,500 SCF/B (445 m$^3$/m$^3$). The product was analyzed for aromatic content by UV spectroscopy and trace sulfur by the Houston-Atlas technique (ASTM D-4045). The results are reported in Table I.

TABLE I

| LHSV | UV @ 274 nm | Aromatic Reduction (%) | Sulfur (wppm) | Sulfur Reduction (%) |
|---|---|---|---|---|
| Feed 1 | 27.2 | — | 2.4 | — |
| 0.6 | 0.56 | 97.9 | N/A | |
| 1.2 | 0.68 | 97.5 | N/A | |
| 1.8 | 0.90 | 96.7 | N/A | |
| 3.5 | 2.2 | 91.9 | N/A | |
| Feed 2 | 70 | — | 4.7 | — |
| 0.63 | 0.78 | 98.9 | 1.0 | 79 |
| 1.20 | 2.14 | 96.9 | 2.8 | 40. |
| 2.36 | 4.32 | 93.8 | 3.0 | 36 |
| 2.97 | 5.30 | 92.4 | 3.2 | 32 |

These results demonstrate that sulfur and aromatic levels of hydrotreated dewaxed raffinates are decreased by hydroprocessing over Pt-Pd/MCM-41(Al$_2$O$_3$). Pt-Pd supported on alumina bound MCM-41 is highly effective at reducing aromatics even when processing higher sulfur containing feedstock. Secondly, the catalyst was also found to have a reasonable HDS activity.

Example 2

This example illustrates the superior HDS and hydrogenation activity of alumina bound MCM-41. The MCM-41 based catalyst is compared with amorphous silica-alumina support. Pt-Pd loading was kept similar for both catalysts. The feedstocks were a hydrotreated solvent raffinate (150 and 600N), ranging from 10 to 250 wppm sulfur, and aromatics content ranging from 72 to 80 wt %.

Operating temperatures between 230° C. and 316° C., a space of 2.0 LHSV, a pressure of 1,800 psig (12,512 kPa) and a treat gas rate of 2,500 SCF/B (445 m$^3$/m$^3$). The effluent products were analyzed for aromatic content by clay gel and trace sulfur by Houston-Atlas technique. The results shown in Table II below.

TABLE II

| Grade/Sulfur | % HYDROGENATION | | | | | | % HYDRODESULFURIZATION | | | | | |
|---|---|---|---|---|---|---|---|---|---|---|---|---|
| (ppm) | 240° C. | 250° C. | 260° C. | 275° C. | 300° C. | 316° C. | 240° C. | 250° C. | 260° C. | 275° C. | 300° C. | 316° C. |
| MCM-41 150/25 | 98.0 | 98.6 | 99.0 | 99.3 | | | | 45 | | 62 | | |
| 150/74 | 65.4 | 96.0 | 97.0 | 98.0 | 99.0 | | 38 | 39 | | 56 | 79 | |
| 150/190 | | | | 96.0 | 98.4 | 98.9 | | | | 41 | 78 | 90 |
| 600/10 | 96.3 | 97.9 | 98.4 | 99.0 | | | | | | | | |
| 600/25 | 95.4 | 96.4 | 97.2 | 98.3 | | | 38 | | 50 | | | |
| 600/64 | 92.0 | 93.1 | 94.2 | 95.7 | 98.0 | | 46 | | 52 | 67 | 78 | |
| SiAl 150/22 | | 95.5 | 97.2 | 97.3 | | | | 35 | 46 | 54 | | |
| 600/10 | | | | 97.8 | 98.4 | 98.6 | | | | | | |
| 600/20 | | | | 98.5 | 98.4 | 99.0 | | | | | | |
| 600/64 | | 84.9 | 85.6 | 89.9 | 93.8 | | | 19 | 23 | 40 | 59 | |

These results demonstrate that Pt-Pd/MCM-41 (Al$_2$O$_3$) has superior hydrogenation and HDS activity than Pt-Pd/SiAl [1800 psig, LHSV 2.0 h-1]

Example 3

In this example the feedstock is a hydrotreated white oil feedstock (350N). The feedstock contained about 4.8 wppm, sulfur and has an aromatic UV adsorption at 275 nm of approximately 70 in a 1 cm cell. The feedstock was processed over a stacked bed of a reduced 20% Ni/alumina acting as the sulfur sorbent and a highly selective Ni based hydrogenation catalyst. The space velocity ranged from 0.6 to 1.0 h-, a pressure was 2,000 psig and treat gas rate 2,500 SCF/B. The product was analyzed for aromatic content by UV spectroscopy and trace sulfur by the Houston-Atlas technique. The results are reported in Table III and the FIGURE.

TABLE III

| Configuration | Hours on Oil | LHSV (h − 1) | UV @ 275 nm | % Hydrogenation |
|---|---|---|---|---|
| Feed | — | — | 70 | — |
| S sorbent/Ni | 12 | 0.61 | 0.30 | 99.6 |
| | 52 | | 0.63 | 99.1 |
| | 76 | 0.75 | 0.67 | 99.0 |
| | 116 | | 1.07 | 98.4 |
| | 140 | 1.0 | 1.80 | 97.4 |
| | 160 | | 1.93 | 97.2 |
| | 180 | | 2.27 | 96.7 |

Example 4

In this example The Pt-Pd/MCM-41(Al2O3) catalyst was placed in front of the catalyst system described in example 3. The product and gas effluent from the MCM-41 based catalyst were directly cascaded to the sulfur sorbent and the Ni hydrogenation catalyst without further treatment. The operating conditions were maintained similar to those in example 3. Comparison with Example 3 reveals an improvement in the hydrogenation activity maintenance by exhibiting a lower deactivation rate when adding the MCM-41 based catalyst to the system.

TABLE IV

| Configuration | Hours on Oil | LHSV (h − 1) | UV @ 275 nm | % Hydrogenation |
|---|---|---|---|---|
| PtPdMCM41/ | 200 | 1.0 | 1.43 | 97.9 |
| S sorbent/Ni | 240 | | 1.42 | 97.9 |

By comparing the results from Tables III and IV, it can bee seen that PtPd/MCM-41(Al2O3) reduces Ni hydrogenation catalyst deactivation when run in a stacked bed configuration.

What is claimed is:

1. A process for the preparation of pharmaceutical grade white oils from a mineral hydrocarbon oil feedstock having a viscosity ranging from about 60 to about 600 SUS at 37.8° C., by a four stage catalytic process, which process comprises: (1) hydrotreating the mineral oil feedstock in a first reaction stage containing a hydrotreating catalyst and a hydrogen-containing treat gas under hydrotreating conditions, thereby resulting in a first stage reaction product which is at least partially hydrogenated and desulfurized; (2) hydrotreating the reaction product of the first reaction stage in a second reaction stage in the presence of: (i) a hydrodesulfurization catalyst comprised of a Group VIII noble metal selected from Pt, Pd, Ir, and mixtures thereof on a bound M41S support, (ii) a hydrogen containing treat gas, wherein the second reaction stage is operated at temperatures from about 150° C. to 500° C. and pressures from about 500 to 3,000 psig (3549 to 20,786 kPa); (3) treating hydrotreated product from stage 2 with a reduced metal hydrogen sulfide sorbent material in stage 3, and (4) hydrogenating the reaction product from reaction stage 3 in a fourth reaction stage in the presence of a Group VIII metal based catalyst, thereby producing a white oil.

2. The process of claim 1 wherein the noble metal is at least one of from Pt and Pd.

3. The process of claim 1 wherein the hydrogen sulfide sorbent material is at least one reduced non-noble Group VIII metal supported on a low acidity oxide.

4. The process of claim 1 wherein the hydrodesulfurization catalyst is promoted with at least one of Re, Cu, Ag, Au, Sn, Mn, and Zn.

5. The process of claim 1 wherein the concentration of Group, VIII noble metal of the catalyst in the second reaction stage is from about 0.01 to 5 wt. %, based on the total weight of the catalyst.

6. The process of claim 1 wherein the hydrotreating catalyst contains at least one of Co, Ni, and Cu.

7. The process of claim 1 wherein the hydrodesulfurization catalyst and the hydrogen sulfide sorbent material are composited into single particles.

8. The process of claim 1 wherein the pressure in the second reaction stage is from about 1,000 to 3,000 psig (6996–20,786 kPa).

9. The process of claim 1 wherein the initial feedstock is a solvent extracted lubricating oil having a viscosity ranging from about 70 to 600 SUS at 37.8° C.

10. The process of claim 1 wherein M41S is a family of mesoporous catalysts including MCM-41, MCM-48 and MCM-50.

11. The process of claim 10 wherein the mesoporous catalyst is MCM-41.

12. The process of claim 1 wherein the Group VIII metal based catalyst is Ni, Pd or Pt on a support.

13. The process of claim 12 wherein the metal based catalyst is Ni.

* * * * *